(12) United States Patent
Iordanoglou

(10) Patent No.: US 10,757,762 B2
(45) Date of Patent: Aug. 25, 2020

(54) ELECTRIC COOKTOP APPLIANCE

(71) Applicant: Haier US Appliance Solutions, Inc., Wilmington, DE (US)

(72) Inventor: Dimitrios Iordanoglou, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 277 days.

(21) Appl. No.: 15/828,560

(22) Filed: Dec. 1, 2017

(65) Prior Publication Data

US 2019/0174581 A1  Jun. 6, 2019

(51) Int. Cl.
| | |
|---|---|
| *H05B 3/74* | (2006.01) |
| *H05B 1/02* | (2006.01) |
| *G01K 1/16* | (2006.01) |
| G01K 13/00 | (2006.01) |
| G01K 7/00 | (2006.01) |

(52) U.S. Cl.
CPC ............... *H05B 3/746* (2013.01); *G01K 1/16* (2013.01); *H05B 1/0266* (2013.01); *G01K 7/00* (2013.01); *G01K 13/00* (2013.01); *G01K 2207/06* (2013.01); *H05B 2213/07* (2013.01)

(58) Field of Classification Search
CPC .................................. H05B 3/746; H05B 3/748
USPC ....................................................... 219/446.1
See application file for complete search history.

(56) References Cited

U.S. PATENT DOCUMENTS

| | | | |
|---|---|---|---|
| 4,161,648 A | 7/1979 | Goessler | |
| 4,237,368 A | 12/1980 | Welch | |
| 5,258,736 A | 11/1993 | Kristen et al. | |
| 6,555,793 B2 | 4/2003 | Griffiths et al. | |
| 6,995,344 B2 * | 2/2006 | McWilliams | H05B 3/742 |
| | | | 219/448.17 |
| 7,307,246 B2 | 12/2007 | Smolenski et al. | |
| 9,220,130 B1 | 12/2015 | Smith | |
| 2003/0042246 A1 * | 3/2003 | Gratz | H05B 3/746 |
| | | | 219/448.14 |

* cited by examiner

*Primary Examiner* — Lauren A Crane
(74) *Attorney, Agent, or Firm* — Dority & Manning, P.A.

(57) ABSTRACT

A cooktop appliance is provided herein. The cooktop appliance may include a ceramic plate, an electric heating element, a temperature sensor, and a thermal conduction strip. The electric heating element may be positioned below the ceramic plate. The electric heating element may define a horizontal length from a center point projected on the ceramic plate. The temperature sensor may be positioned between the ceramic plate and the electric heating element relative to a vertical direction. The temperature sensor may be spaced apart from the ceramic plate and the electric heating element. The thermal-conduction strip may be attached to the temperature sensor. The thermal-conduction strip may extend in contact with a bottom surface of the ceramic plate between an inner tip proximal to the center point and an outer tip distal to the center point.

19 Claims, 7 Drawing Sheets

ELECTRIC COOKTOP APPLIANCE

FIELD OF THE INVENTION

The present subject matter relates generally to cooktop appliances, such as radiant or induction cooktop appliances, and systems for controlling heating by the cooktop appliances.

BACKGROUND OF THE INVENTION

Certain cooktop appliances include electric heating elements for heating pots, pans and other containers with food items therein. The electric heating elements can be operated at various settings. For example, the electric heating elements can be operated at a low heat setting to simmer food items, or the electric heating elements can be operated at a high heat setting to boil water or fry food items.

Operating the electric heating elements on the high heat setting poses challenges. For example, product safety certifications frequently require appliances with electric heating elements to operate below temperature limits at the high heat settings. However, controlling heating of electric heating elements to avoid overheating while also avoiding unnecessary deactivation of the electric heating elements can be difficult.

Accordingly, a cooktop appliance with an electric heating element and features for accurately regulating heating of utensil on the cooktop appliance would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a cooktop appliance is provided. The cooktop appliance may include a ceramic plate, an electric heating element, a temperature sensor, and a thermal conduction strip. The electric heating element may be positioned below the ceramic plate. The electric heating element may define a horizontal length from a center point projected on the ceramic plate. The temperature sensor may be positioned between the ceramic plate and the electric heating element relative to a vertical direction. The temperature sensor may be spaced apart from the ceramic plate and the electric heating element. The thermal-conduction strip may be attached to the temperature sensor. The thermal-conduction strip may extend in contact with a bottom surface of the ceramic plate between an inner tip proximal to the center point and an outer tip distal to the center point. The thermal-conduction strip may span a point defined at a position between 50% and 100% of the horizontal length.

In another exemplary aspect of the present disclosure, a cooktop appliance is provided. The cooktop appliance may include a ceramic plate, an electric heating element, a temperature sensor, and a thermal conduction strip. The electric heating element may be positioned below the ceramic plate. The electric heating element may define a radial length along a radial direction from a center point projected on the ceramic plate. The temperature sensor may be positioned between the ceramic plate and the electric heating element relative to a vertical direction. The temperature sensor may be spaced apart from the ceramic plate and the electric heating element. The thermal-conduction strip may be attached to the temperature sensor. The thermal-conduction strip may extend along the radial direction in contact with a bottom surface of the ceramic plate between an inner tip proximal to the center point and an outer tip distal to the center point. The thermal-conduction strip may span a point defined at a position between 50% and 100% of the radial length.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
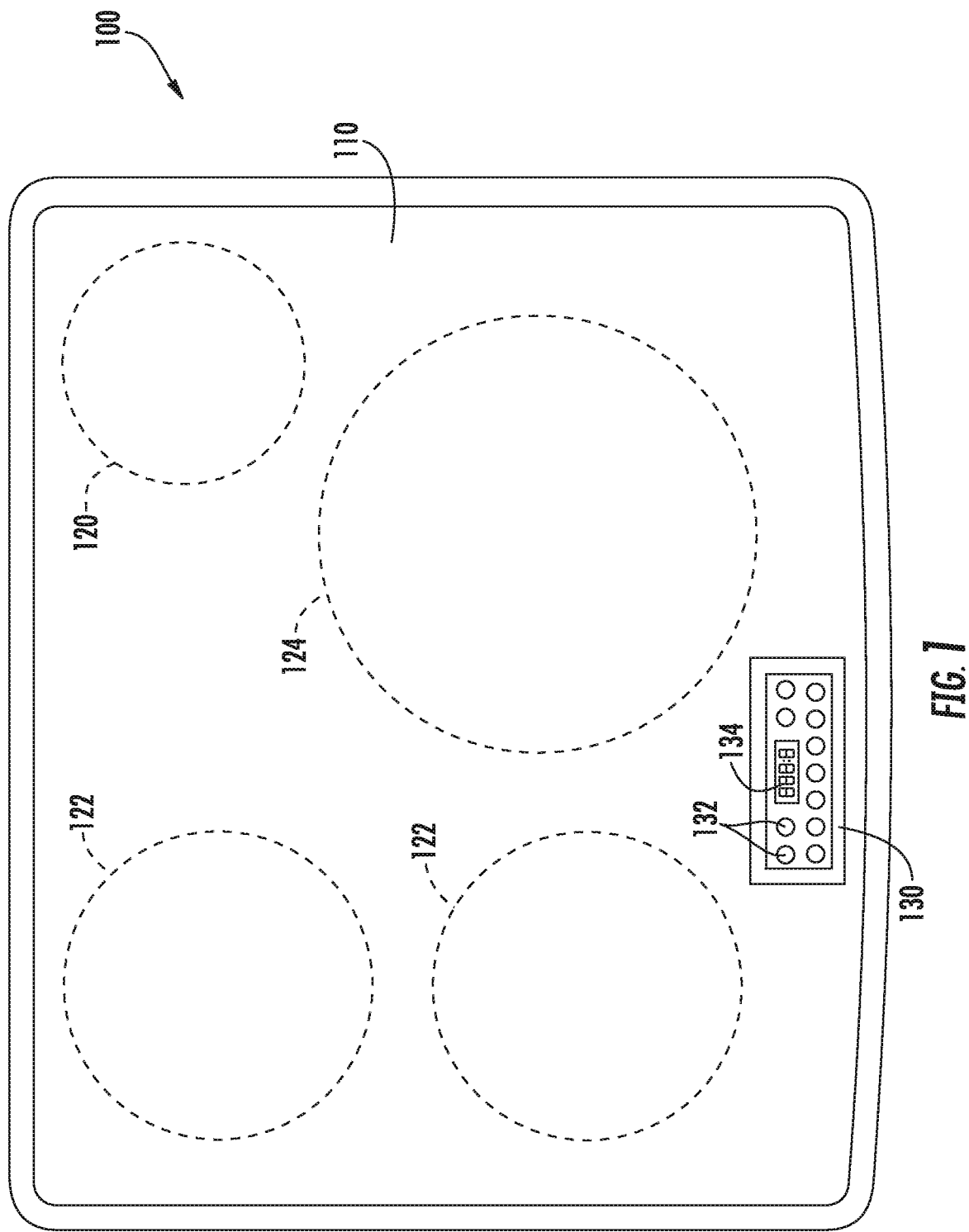
FIG. 1 provides a top, plan view of a cooktop appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a top, plan view of a cooktop appliance 100 according to exemplary embodiments of the present disclosure. Cooktop appliance 100 can be installed in various locations such as in cabinetry in a kitchen, with one or more ovens to form a range appliance, or as a standalone appliance. Thus, as used herein, the term "cooktop appliance" includes grill appliances, stove appliances, range appliances, and other appliances that incorporate cooktops.

Cooktop appliance 100 includes a ceramic plate 110 for supporting cooking utensils, such as pots or pans, on a cooking or top surface 114 of ceramic plate 110. When assembled, top surface 114 (FIG. 3) is directed vertically upward to contact cooking utensils, while a bottom surface 112 is directed vertically downward opposite the top surface 114. Ceramic plate 110 may be any suitable ceramic or glass plate (e.g., glass ceramic). Radiant heating assemblies 120, 122, and 124 are mounted below ceramic plate 110 such that heating assemblies 120, 122, and 124 are positioned below ceramic plate 110 (e.g., below the bottom surface 112 along the vertical direction V—FIG. 3). Ceramic plate 110 may be continuous over heating assemblies 120, 122 and 124. Thus, no holes may extend vertically through ceramic plate 110 above heating assemblies 120, 122 and 124. However, it will be understood that a hole may extend through ceramic plate 110 at one of heating assemblies 120, 122 and 124, in certain exemplary embodiments.

While shown with four heating assemblies 120, 122, and 124 in the exemplary embodiment of FIG. 1, cooktop appliance 100 may include any number of heating assemblies 120, 122, and 124 in alternative embodiments. Heating assemblies 120, 122, and 124 can also have various diameters. For example, each heating assembly of heating assemblies 120, 122, and 124 can have a different diameter, the same diameter, or any suitable combination thereof. In addition, heating assembly 120 includes one radiant heating element or zone. Conversely, heating assemblies 122 include two radiant heating elements or zones, and heating assembly 124 includes three radiant heating elements or zones. However, cooktop appliance 100 is provided by way of example only and is not limited to the exemplary embodiment shown in FIG. 1. For example, a cooktop appliance having one or more radiant heating assemblies in combination with one or more electric resistance or gas burner heating elements can be provided. In addition, various combinations of number of heating assemblies, position of heating assemblies or size of heating assemblies can be provided. It will also be understood that the present subject matter is suitable for use with other electric heating elements, such as induction heating elements.

Generally, a user interface 130 provides visual information to a user and allows a user to select various options for the operation of cooktop appliance 100. For example, displayed options can include a desired heating assemblies 120, 122 and 124, a desired cooking temperature, or other options. User interface 130 can be any type of input device and can have any configuration. In FIG. 1, user interface 130 is located within a portion of ceramic plate 110. Alternatively, user interface 130 can be positioned on a vertical surface near a front side of cooktop appliance 100 or at another location that is convenient for a user to access during operation of cooktop appliance 100.

In some embodiments, such as that shown in FIG. 1, user interface 130 includes a capacitive touch screen input device component 132. Capacitive touch screen input device component 132 can allow for the selective activation, adjustment or control of any or all heating assemblies 120, 122, and 124 as well as any timer features or other user adjustable inputs. One or more of a variety of electrical, mechanical, or electro-mechanical input devices including rotary dials, push buttons, toggle/rocker switches, or touch pads can also be used singularly or in combination with capacitive touch screen input device component 132. User interface 130 also includes a display component 134, such as a digital or analog display device designed to provide operational feedback to a user.

Figure 2:
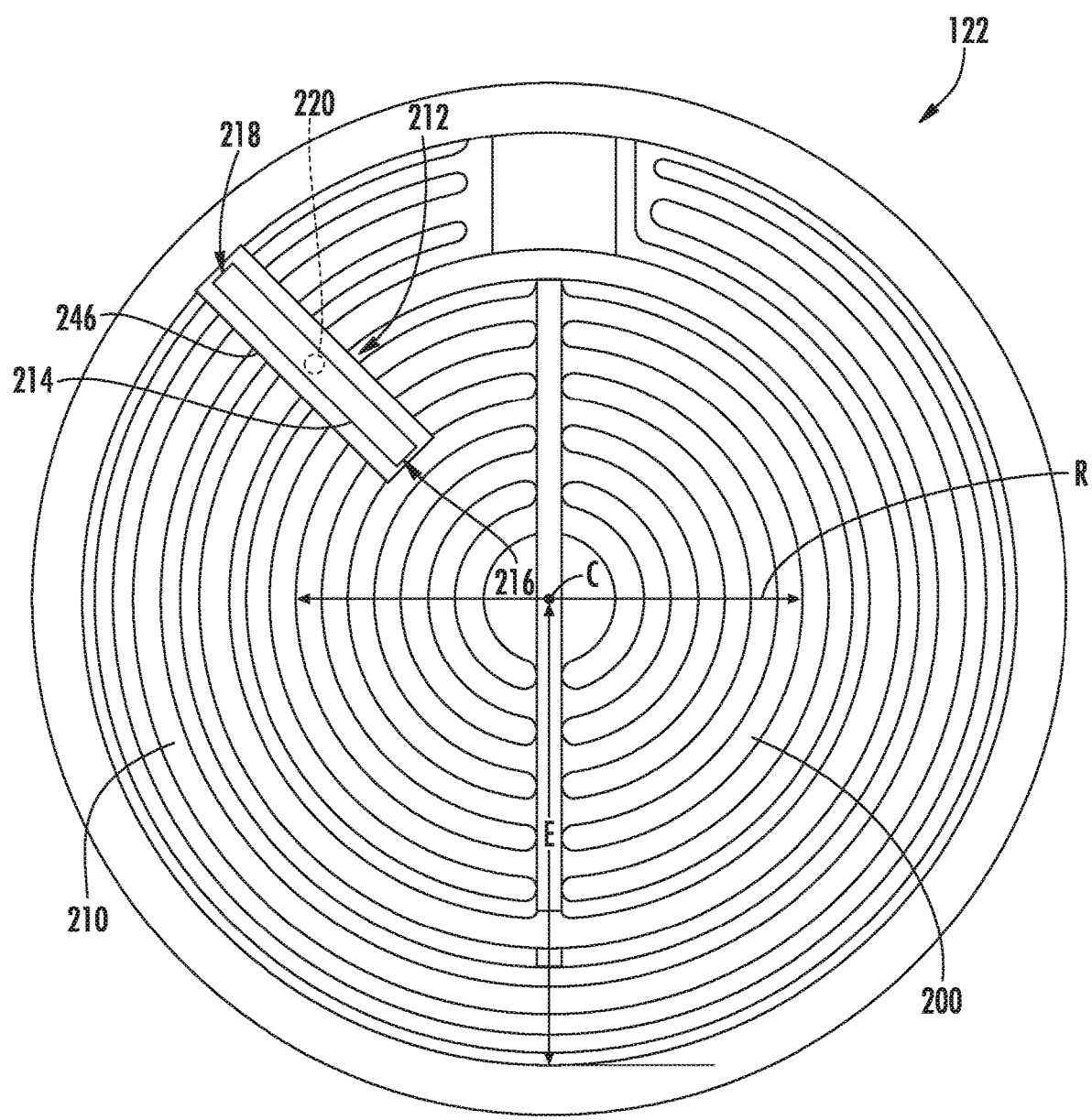
FIG. 2 provides a top, plan view of a two element, electric heating assembly for a cooktop appliance, according to exemplary embodiments of the present disclosure.

FIG. 2 provides a top, plan view of heating assembly 122 of cooktop appliance 100 (FIG. 1). As may be seen in FIG. 2, heating assembly 122 includes one or more heating elements (e.g., heating elements 200, 210) that have a footprint from which heat is projected on the ceramic plate 110 (e.g., perpendicular to the vertical direction V—FIG. 3). The footprint may generally be defined by one or more horizontal widths (e.g., radial length E) extending from a centroid or center point C of the footprint to an outermost edge of the heating element(s) (e.g., heating element 210). Thus, heating elements 200, 210 define a horizontal length from center point C. In some such embodiments, the horizontal length is a radial length E that extends outward along a radial direction R from center point C to the perimeter defined by the radially outermost element (e.g., heating element 210).

In some embodiments, heating assembly 122 includes a plurality of heating elements. As illustrated, exemplary embodiments include a first or inner heating element 200 and a second or outer heating element 210. In the illustrated embodiments, heating element 210 of heating assembly 122 is positioned concentrically relative to inner heating element 200 of heating assembly 122. In particular, inner heating element 200 of heating assembly 122 and outer heating element 210 of heating assembly 122 are spaced apart from each other (e.g., along radial direction R), such that outer heating element 210 of heating assembly 122 extends circumferentially around at least a portion of inner heating element 200 of heating assembly 122.

Figure 3:
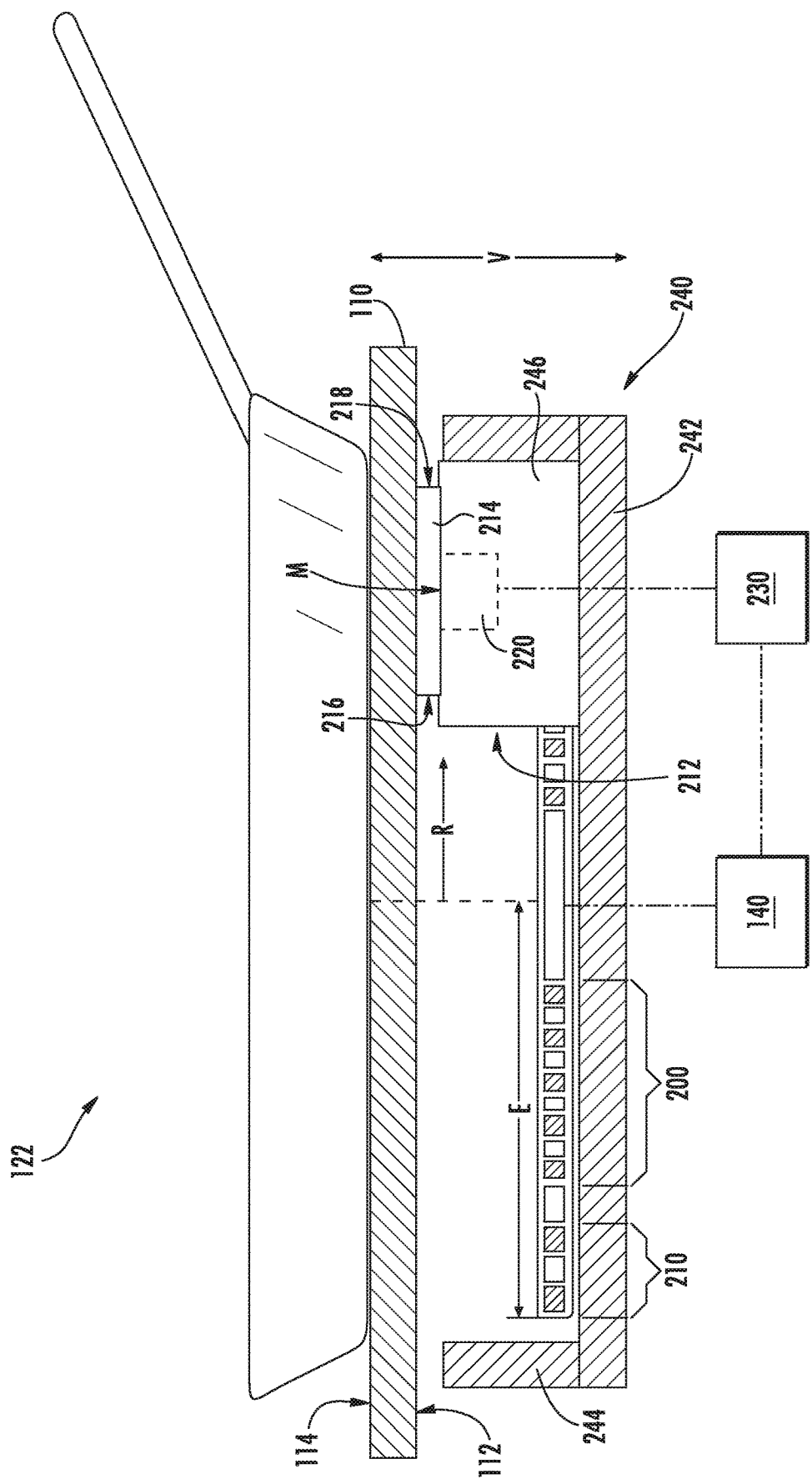
FIG. 3 provides a cross sectional schematic view of certain components of the heating assembly and cooktop appliance of FIG. 2.

FIG. 3 provides a cross sectional schematic view of certain components of cooktop appliance 100. As shown, each heating assembly (e.g., heating assembly 122) includes a frame 240 on which heating elements (e.g., heating elements 200, 210) are supported. As would be understood, frame 240 may include a number of discrete parts and materials to support and enclose heating elements 200, 210. In particular, frame 240 may include a suitable base wall 242 and insulated wall 244 extending from base wall 242 (e.g., in the vertical direction V towards ceramic plate 110). When assembled, insulated wall 244 is positioned below ceramic plate 110 (e.g., below bottom surface 112) and circumferentially surrounds electric heating elements 200, 210. For example, insulated wall 244 may be formed as a circular ring or loop (e.g., as a toroid having a rectangular cross section) positioned about center point C (e.g., coaxial to heating elements 200, 210). Thus, insulated wall 244 may bound (e.g., extend about) the perimeter of the footprint and radial length E of heating elements 200, 210. Generally, insulated wall 244 includes or is formed from any suitable insulation material, such as ceramic or metallic insulation materials.

As shown in FIGS. 2 and 3, cooktop appliance 100 includes a detection assembly 212 (e.g., with each heating assembly). In particular, detection assembly 212 includes a temperature sensor 220 and a thermal-conduction strip 214 positioned below the ceramic plate 110. Temperature sensor 220 may be any suitable type of temperature sensor, such as a thermocouple, a thermistor, or resistance temperature detector (RTD). Thermal-conduction strip 214 is formed from a suitable material having a high thermal-conductivity, such as a metal including copper or aluminum.

Generally, thermal-conduction strip 214 is mounted above temperature sensor 220 and is attached in thermal communication (e.g., direct contact or contact through an intermediate thermal paste) to temperature sensor 220. In certain embodiments, temperature sensor 220 is positioned between ceramic plate 110 and electric heating elements 200, 210 (e.g., relative to the vertical direction V).

Thermal-conduction strip 214 extends above temperature sensor 220 and may engage or contact ceramic plate 110. In some such embodiments, thermal-conduction strip 214 extends in contact (e.g., direct contact or contact through an intermediate thermal paste) with bottom surface 112 between an inner tip 216 and an outer tip 218. Thus, the portion of thermal-conduction strip 214 from inner tip 216 and outer tip 218 may be mounted in contact with bottom surface 112. When assembled, inner tip 216 may be proximal to the center point C while outer tip 218 distal to the center point C. In other words, inner tip 216 is positioned closer to center point C than outer tip 218.

In some embodiments, thermal-conduction strip 214 extends along the radial direction R (e.g., linearly). For instance, inner tip 216 and outer tip 218 may be positioned at discrete points along the radial direction R. In some embodiments, the horizontal length of thermal-conduction strip (e.g., the radial length E between inner tip 216 and outer tip 218) is greater than the horizontal width (e.g., the dimension perpendicular to the horizontal length). Thus, some embodiments of thermal-conduction strip 214 may have a substantially rectangular horizontal profile.

As shown, thermal-conduction strip 214 is radially offset from center point C. In other words, thermal-conduction strip 214 may terminate at a point that is spaced apart from center point C along the radial direction R. When assembled, thermal-conduction strip 214 will extend across or span one or more points between 50% and 100% of the radial length E (e.g., between half the radial distance from the center point C to the outermost edge of heating element 210 and the outermost edge of heating element 210). Optionally, thermal-conduction strip 214 may be radially offset (e.g., at inner tip 216) along the radial direction R at a distance from center point C that is no less than one inch and no more than eight inches.

In some embodiments, such as those generally illustrated in FIGS. 2 and 3, the inner tip 216 of thermal-conduction strip 214 is located at a point or position that is equal to or less than 50% of the radial length E. For instance, the inner tip 216 may stop or terminate at a point that is located at a distance that is 50% of the radial length E from center point C. In additional or alternative embodiments, the outer tip 218 of the thermal-conduction strip 214 is located at a point or position that is equal to or greater than 95% of the radial length E. For instance, the outer tip 218 may stop or terminate at a point that is located at a distance that is 95% of the radial length E from center point C.

Figure 6:
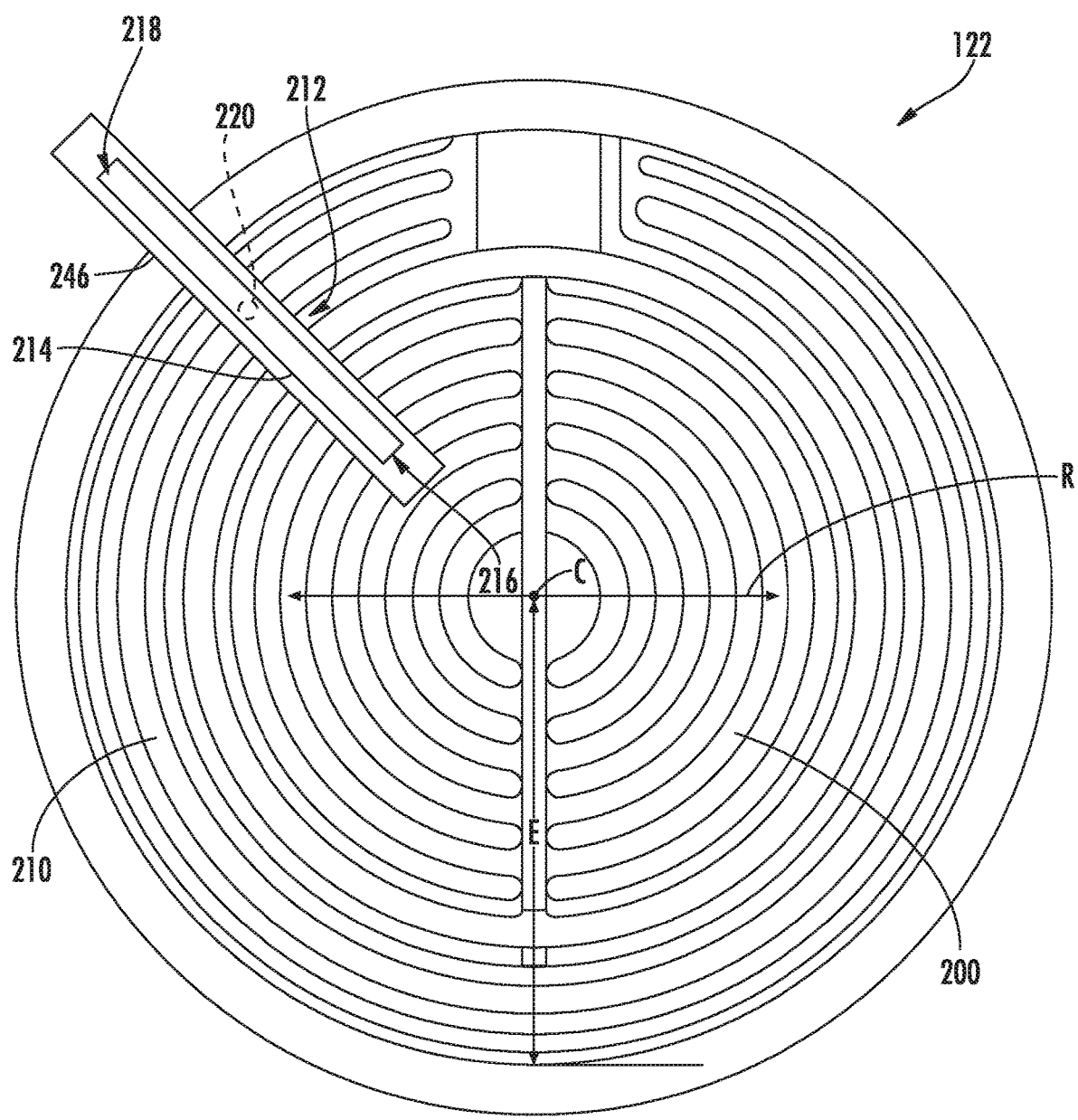
FIG. 6 provides a top, plan view of a two element, electric heating assembly for a cooktop appliance, according to exemplary embodiments of the present disclosure.
Figure 7:
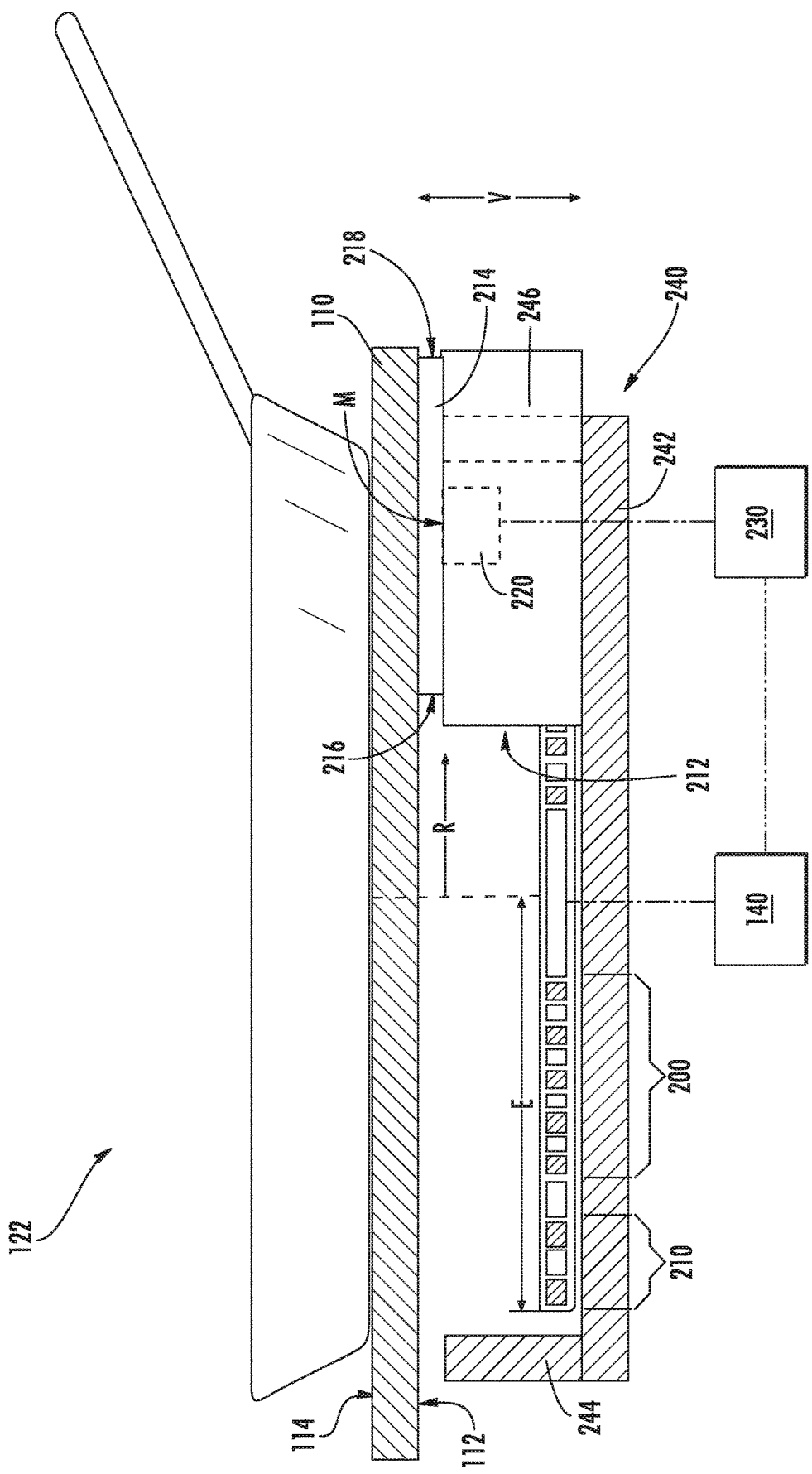
FIG. 7 provides a cross sectional schematic view of certain components of the heating assembly and cooktop appliance of FIG. 6.

As generally illustrated in FIGS. 6 and 7, some embodiments of thermal-conduction strip 214 may extend to or beyond the radial length E of the heating element(s). In particular, thermal-conduction strip 214 may extend from a point that is within the radial length E (i.e., at a distance less than 100% of the radial length E) to a point that is located outside of the radial length E (i.e., at a distance greater than or equal to 100% of the radial length E). For instance, the outer tip 218 of thermal-conduction strip 214 may stop or terminate at a point that is located at a distance that is between 100% and 125% of the radial length E from the center point C. In certain embodiments, the outer tip 218 may stop or terminate at a point that is located at a distance that is 120% of the radial length E from center point C. As noted above, the inner tip 216 of thermal-conduction strip 214 may be located at a point or position that is equal to or less than 50% of the radial length E. For instance, the inner tip 216 may stop or terminate at a point that is located at a distance that is 50% of the radial length E from center point C.

As shown in FIGS. 2 and 3, as well as FIGS. 6 and 7, thermal-conduction strip 214 may advantageously extend beneath (e.g., directly beneath) a length of ceramic plate 110 that is likely to receive a utensil during use (e.g., when utensil is disposed over heating elements 200, 210). Moreover, thermal-conduction strip 214 may advantageously accommodate and accurately measure temperature from a wider variety of utensil shapes, such as utensils that have a curved or otherwise non-planar (e.g., concave) bottom surface that does not entirely contact the top surface 114 of ceramic plate 110 above center point C.

In some embodiments, an insulated block 246 is provided below thermal-conduction strip 214. For instance, insulated block 246 may extend below thermal-conduction strip 214 (e.g., in support thereof) along the vertical direction V. Thus, thermal-conduction strip 214 may be held between the bottom surface 112 of ceramic plate 110 and an upper portion of the insulated block 246. Insulated block 246 may be enclosed within frame 240. Optionally, insulated block 246 may rest on base wall 242 or another suitable portion of frame 240.

Generally, insulated block 246 extends above heating element(s) (e.g., heating elements 200, 210). In turn, heating elements 200, 210 may be positioned beneath (e.g., directly beneath) insulated block 246. Additionally or alternatively, heating elements 200, 210 may be positioned through a portion of insulated block 246. In further addition or alternative, heating elements 200, 210 may be positioned about insulated block 246 such that heating elements 200, 210 neither extend through or directly beneath insulated block 246. When assembled, insulated block 246 thermally isolates thermal-conduction strip 214 from heating element(s) (e.g., heating elements 200, 210). Thus, thermal-conduction strip 214 may notably engage within a utensil positioned on the top surface 114 of ceramic plate 110.

Insulated block 246 includes or is formed from any suitable insulation material, such as ceramic or metallic insulation materials. Moreover, insulated block 246 is formed as any suitable shape. For instance, insulated block 246 may be formed as a rectangular prism having a substantially rectangular horizontal footprint. Additionally or alternatively, the horizontal footprint of the insulated block 246 may be greater than the footprint of thermal-conduction strip 214. In particular, the horizontal length and width of insulated block 246 may be greater than the horizontal length and width of thermal-conduction strip 214.

As noted above, temperature sensor 220 is positioned below ceramic plate 110. For instance, temperature sensor 220 may be mounted at a position that is enclosed by (e.g., radially inward from) insulated wall 244. In some embodiments, temperature sensor 220 is mounted within insulated block 246. For instance, temperature sensor 220 may be embedded inside of insulated block 246. In alternative embodiments, temperature sensor 220 is mounted within insulated wall 244. Advantageously, signal(s) from temperature sensor 220 may correspond to a temperature of ceramic plate 110 or a cooking utensil on ceramic plate 110 above heating assembly 122.

Along with being mounted within insulated block 246 or insulated wall 244, temperature sensor 220 may be mounted in contact with thermal-conduction strip 214. In some embodiments, temperature sensor 220 contacts a bottom portion of thermal-conduction strip 214 at a point along the radial length E. Moreover, temperature sensor 220 may contact thermal-conduction strip 214 at a point less than 100% of radial length E (e.g., radially inward from insulated wall 244). In some such embodiments, temperature sensor 220 contacts thermal-conduction strip 214 at a midpoint M of thermal-conduction strip 214 (e.g., between inner tip 216 and outer tip 218). Notably, the present configuration may improve consistency and accuracy for temperature measurements at temperature sensor 220.

As may be seen in FIGS. 3 and 7, cooktop appliance 100 includes a controller 140. Operation of cooktop appliance 100 is regulated by controller 140. Controller 140 is operatively coupled or in communication with various components of cooktop appliance 100, including user interface 130. In response to user manipulation of the user interface 130, controller 140 operates the various components of cooktop appliance 100 to execute selected cycles and features.

Controller 140 may include memory (e.g., non-transitory media) and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 140 may be constructed without using a microprocessor (e.g., using a combination of discrete analog or digital logic circuitry, such as switches, amplifiers, integrators, comparators, flip-flops, AND gates, and the like) to perform control functionality instead of relying upon software. User input 130 and other components of cooktop appliance 100 may be in communication with controller 140 via one or more signal lines or shared communication busses.

Controller 140 is also in operative communication with heating assemblies 120, 122, and 124 of cooktop appliance 100. As may be seen in FIG. 3, heating assembly 122 includes a relay 230. Relay 230 of heating assembly 122 is coupled to inner heating element 200 of heating assembly 122 and outer heating element 210 of heating assembly 122. Utilizing relay 230, controller 140 can selectively activate and deactivate inner heating element 200 of heating assembly 122 and outer heating element 210 of heating assembly 122. Controller 140 may open and close relay 230 in response to temperature measurements from temperature sensor 220, as discussed in greater detail below. It will be understood that heating assemblies 120 and 124 may also include respective temperature sensors and relays, in the same or similar manner to that described above for heating assembly 122.

Figure 4:
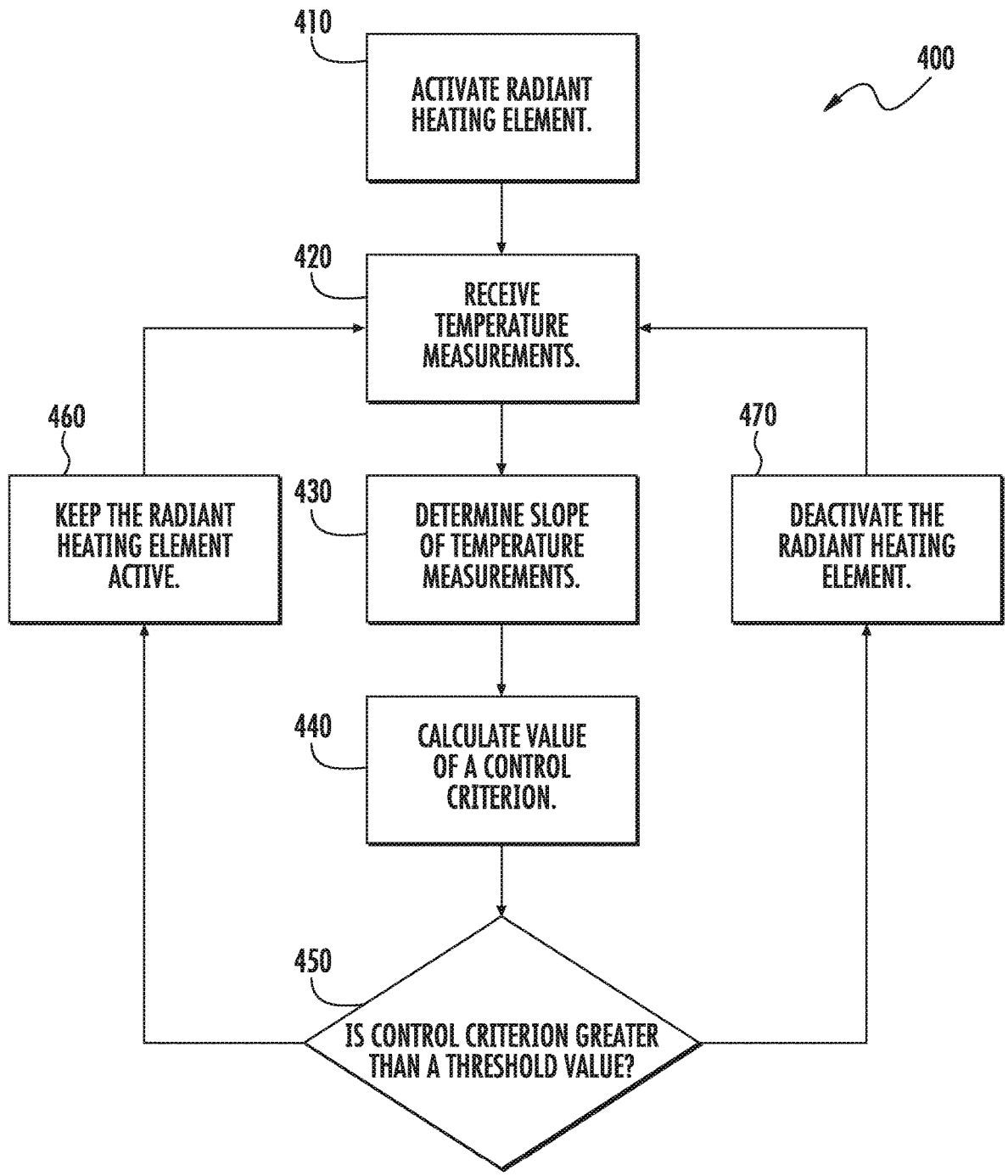
FIG. 4 illustrates a method of operating a cooktop appliance according to exemplary embodiments of the present disclosure.

FIG. 4 illustrates a method 400 for operating a cooktop appliance according to an exemplary embodiment of the present subject matter. Method 400 can be used to operate any suitable cooktop appliance. As an example, method 400 may be used to operate cooktop appliance 100 (FIG. 1). Controller 140 (FIG. 3) may be programmed to implement method 400. Utilizing method 400, controller 140 regulates heating of a cooking utensil on ceramic plate 110 such that a temperature of the cooking utensil is less than a threshold temperature.

At 410, controller 140 activates heating assembly 122. For example, controller 140 may close relay 230 in order to activate heating assembly 122 at 410. When heating assembly 122 is active, heat transfer from heating assembly 122 to a cooking utensil on ceramic plate 110 over heating assembly 122 may increase a temperature of the cooking utensil.

At 420, controller 140 receives a plurality of temperature measurements from temperature sensor 220. Heating assembly 122 may be activated at 420. Thus, the temperature measurements from temperature sensor 220 may increase over time during 420. Heating assembly 122 may also be deactivated at 420. Thus, the temperature measurements from temperature sensor 220 may decrease over time during 420. At 430, controller 140 determines a slope or a change between the temperature measurements from 420 over time.

At 440, controller 140 calculates a value of a control criterion with the change between the temperature measurements over time from 430. Thus, the control criterion is a function of at the least a temperature change with respect to time. The control criterion may also be a function of temperature. The control criterion may be any suitable function of a temperature change with respect to time. For example, the control criterion may be a linear combination of temperature and the temperature change with respect to time. In particular, the control criterion may be written as $$F\left(T, \frac{dT}{dt}\right) = A - B * \frac{dT}{dt} - T$$

where
F is the control criterion function,
T is temperature,
t is time,
dT/dt is temperature change with respect to time,
A is a first constant, and
B is a second constant.

The value of the control criterion calculated at 440 is compared to a threshold value at 450. The threshold value or the values of A and B may be selected such that heating assembly 122 does not heat a cooking utensil on ceramic plate 100 to more than seven hundred and fifty degrees Fahrenheit (750° F.) when heating assembly 122 is activated. The threshold value or the values of A and B may be predetermined (e.g., by a manufacturer of cooktop appliance 100) and saved within the memory of controller 140. As an example, the threshold value may be about zero. As used herein, the term "about" means within ±3 of the stated threshold value when used in the context of control criterion threshold values. The threshold value may also vary depending upon the crossing direction. For example, when the control criterion is changing from lower to higher values [i.e., increasing, the threshold value may be positive three (3)]. However, when the control criterion is changing from higher to lower values [i.e., decreasing, the threshold value may be negative three (−3)].

As noted above, controller 140 compares the value of the control criterion calculated at 440 to the threshold value at 450. For example, depending upon the selected control criterion and threshold value, comparing the value of the control criterion calculated at 440 to the threshold value at 450 may include determining that the value of the control criterion calculated at 440 is greater than (or less than) the threshold value. Controller 140 may open or close relay 230 depending upon the value of the control criterion calculated at 440 relative to the threshold value. In particular, controller 140 opens relay 230 in response to the value of the control criterion from 440 passing or crossing the threshold value at 450. Relay 230 terminates electrical power to heating assembly 122 when relay 230 is open. In contrast, controller 140 keeps relay 230 closed in response to the value of the control criterion from 440 not passing (e.g., exceeding) the threshold value at 450. Thus, heating assembly 122 continues to heat ceramic plate 110 and cooking utensils thereon when the value of the control criterion from 440 does not pass the threshold value at 450.

Utilizing method 400, controller 140 can maintain the temperature of a cooking utensil on ceramic plate 110 below a threshold temperature, such as an auto ignition temperature of oil, during operation of heating assembly 122, while also limiting deactivation of heating assembly 122. For example, when the control criterion is a function of both temperature and temperature change with respect to time, method 400 may assist with avoiding exceeding the threshold temperature due to the temperature lag between readings from temperature sensor 220 and the actual temperature of the cooking utensil on ceramic plate 110.

Figure 5:
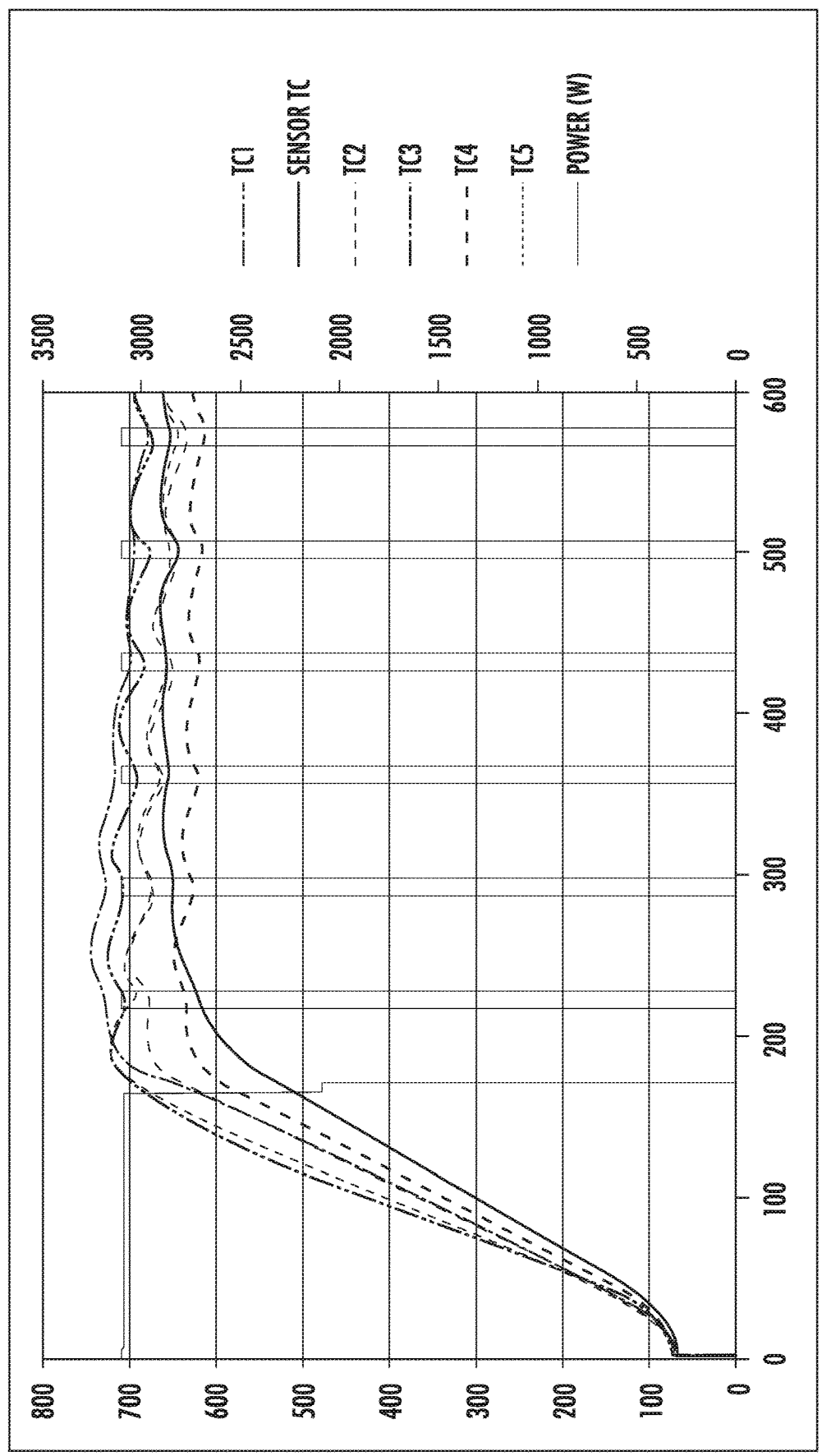
FIG. 5 provides a plot of temperature sensor measurements during operation of the exemplary cooktop appliance of FIG. 1 according to the exemplary method of FIG. 4.

FIG. 5 provides a plot of temperature sensor measurements during operation of cooktop appliance 100 according method 400. In FIG. 5, the temperature measurements labeled "TC1," "TC2," "TC3," "TC4," and "TC5" correspond to temperature sensor measurements at various locations within a cooking utensil on ceramic plate 110 above heating assembly 122. The temperature measurements labeled "Sensor TC" correspond to temperature sensor measurements from temperature sensor 220. As may be seen in FIG. 5, by configuring controller 140 to implement method 400 and thereby open and close relay 230, the temperature of the cooking utensil on ceramic plate 110 above heating assembly 122 does not exceed seven hundred and fifty degrees Fahrenheit (750° F.) despite the readings of temperature sensor 220 lagging behind the temperature of the cooking utensil on ceramic plate 110 above heating assembly 122 during an initial three to four minutes of operating the heating assembly 122. Thus, method 400 may effectively maintain the temperature of a cooking utensil on ceramic plate 110 below a threshold temperature based upon temperature measurements from temperature sensor 220.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance, comprising:
   a ceramic plate;
   an electric heating element positioned below the ceramic plate, the electric heating element defining a horizontal length from a center point projected on the ceramic plate;
   a temperature sensor positioned between the ceramic plate and the electric heating element relative to a vertical direction, the temperature sensor being spaced apart from the ceramic plate and the electric heating element; and
   a thermal-conduction strip attached to the temperature sensor, the thermal-conduction strip extending in contact with a bottom surface of the ceramic plate between an inner tip proximal to the center point and an outer tip distal to the center point, the thermal-conduction strip spanning a point defined at a position between 50% and 100% of the horizontal length.

2. The cooktop appliance of claim 1, wherein the inner tip is located at a position 50% of the horizontal length.

3. The cooktop appliance of claim 2, wherein the outer tip is located at a position 95% of the horizontal length.

4. The cooktop appliance of claim 1, wherein the outer tip is located at a position 95% of the horizontal length.

5. The cooktop appliance of claim 1, wherein the outer tip is located at a position outside of the horizontal length.

6. The cooktop appliance of claim 1, further comprising an insulated wall surrounding the electric heating element below the ceramic plate, wherein the temperature sensor is mounted within the insulated wall.

7. The cooktop appliance of claim 1, further comprising an insulated block supporting the thermal-conduction strip below the ceramic plate, wherein the temperature sensor is mounted within insulated block.

8. The cooktop appliance of claim 1, wherein the temperature sensor contacts thermal-conduction strip at a midpoint between the inner tip and the outer tip.

9. The cooktop appliance of claim 1, wherein the temperature sensor is a thermocouple, thermistor, or resistance temperature detector (RTD).

10. A cooktop appliance, comprising:
    a ceramic plate;
    an electric heating element positioned below the ceramic plate, the electric heating element defining a radial length along a radial direction from a center point projected on the ceramic plate;
    a temperature sensor positioned between the ceramic plate and the electric heating element relative to a vertical direction, the temperature sensor being spaced apart from the ceramic plate and the electric heating element; and
    a thermal-conduction strip attached to the temperature sensor, the thermal-conduction strip extending along the radial direction in contact with a bottom surface of the ceramic plate between an inner tip proximal to the center point and an outer tip distal to the center point, the thermal-conduction strip spanning a point defined at a position between 50% and 100% of the radial length.

11. The cooktop appliance of claim 10, wherein the inner tip is located at a position 50% of the radial length.

12. The cooktop appliance of claim 11, wherein the outer tip is located at a position 95% of the radial length.

13. The cooktop appliance of claim 10, wherein the outer tip is located at a position 95% of the radial length.

14. The cooktop appliance of claim 10, wherein the outer tip is located at a position outside of the radial length.

15. The cooktop appliance of claim 10, further comprising an insulated wall surrounding the electric heating element below the ceramic plate, wherein the temperature sensor is mounted within the insulated wall.

16. The cooktop appliance of claim 10, further comprising an insulated block supporting the thermal-conduction strip below the ceramic plate, wherein the temperature sensor is mounted within insulated block.

17. The cooktop appliance of claim 10, wherein the temperature sensor contacts thermal-conduction strip at a midpoint between the inner tip and the outer tip.

18. The cooktop appliance of claim 10, wherein the temperature sensor is a thermocouple, thermistor, or resistance temperature detector (RTD).

19. A cooktop appliance, comprising:
    a ceramic plate;
    an electric heating element positioned below the ceramic plate, the electric heating element defining a horizontal length from a center point projected on the ceramic plate;
    a temperature sensor positioned between the ceramic plate and the electric heating element relative to a vertical direction, the temperature sensor being spaced apart from the ceramic plate and the electric heating element; and a thermal-conduction strip attached to the temperature sensor, the thermal-conduction strip extending in direct contact with a bottom surface of the ceramic plate between an inner tip proximal to the center point and an outer tip distal to the center point, the thermal-conduction strip spanning a point defined at a position between 50% and 100% of the horizontal length.

* * * * *